United States Patent
Pahlevaninezhad et al.

(10) Patent No.: US 12,289,064 B2
(45) Date of Patent: Apr. 29, 2025

(54) DIFFERENTIAL GEOMETRY BASED DC/AC INVERTERS

(71) Applicant: SPARQ SYSTEMS INC., Kingston (CA)

(72) Inventors: Majid Pahlevaninezhad, Kingston (CA); Praveen Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 264 days.

(21) Appl. No.: 17/887,980

(22) Filed: Aug. 15, 2022

(65) Prior Publication Data
US 2024/0055999 A1   Feb. 15, 2024

(51) Int. Cl.
*H02M 7/483*   (2007.01)
*H02J 3/38*   (2006.01)
*H02M 1/00*   (2007.01)

(52) U.S. Cl.
CPC ........... *H02M 7/4837* (2021.05); *H02J 3/381* (2013.01); *H02M 1/007* (2021.05); *H02M 7/4833* (2021.05)

(58) Field of Classification Search
USPC .................................................. 703/18, 2, 4
See application file for complete search history.

(56) References Cited

U.S. PATENT DOCUMENTS

| | | | | |
|---|---|---|---|---|
| 10,680,505 B2 * | 6/2020 | Yoscovich | | H02M 1/143 |
| 2011/0249479 A1 * | 10/2011 | Capitaneanu | | H02M 7/487 |
| | | | | 363/132 |
| 2014/0009988 A1 * | 1/2014 | Valiani | | H02M 7/487 |
| | | | | 363/131 |
| 2014/0334206 A1 * | 11/2014 | Valiani | | H02M 7/487 |
| | | | | 363/97 |
| 2017/0104334 A1 * | 4/2017 | Premerlani | | H02M 7/44 |
| 2020/0007050 A1 * | 1/2020 | Fu | | H02M 7/4837 |
| 2021/0111643 A1 * | 4/2021 | Hsin | | H02M 7/487 |

FOREIGN PATENT DOCUMENTS

WO   WO-2018166577 A1 *   9/2018

OTHER PUBLICATIONS

Rodríguez et al. Multilevel Converters: An Enabling Technology for High-Power Applications, 2009, IEEE, vol. 97 Issue 11 pp. 1786-1817, Digital Object Identifier: 10.1109/JPROC.2009.2030235 (Year: 2009).*

* cited by examiner

*Primary Examiner* — Gustavo A Rosario-Benitez
(74) *Attorney, Agent, or Firm* — Brion Raffoul

(57) ABSTRACT

A DC/AC inverter and microinverter architectures using the DC/AC inverter are disclosed. The DC/AC inverter is based on a differential geometry control scheme to balance and optimize the flying capacitor voltages across the flying capacitors used in the inverter's power circuit. Based on changing inverter and overall system conditions, including capacitor voltages, grid voltages, grid current, and DC bus voltages, desired fields are generated. These fields are used to balance capacitor voltages such that capacitor voltage values converge, over time, to an optimal solution.

7 Claims, 21 Drawing Sheets

DIFFERENTIAL GEOMETRY BASED DC/AC INVERTERS

TECHNICAL FIELD

The present invention relates to power conversion. More specifically, the present invention relates to DC/AC inverters that use a differential geometry based control scheme and microinverters that use such DC/AC inverters.

BACKGROUND

There are a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. In solar energy harvesting systems, a DC/AC inverter is used as the interface to the utility grid in various configurations. The grid-connected DC/AC inverter therefore plays a crucial role in the performance and reliability of the solar energy harvesting systems.

There are several power architectures used for solar energy harvesting systems. FIG. 1 is a block diagram of a solar energy harvesting system that uses string inverters according to the prior art. In the configuration in FIG. 1, a string of photovoltaic (PV) panels are placed in series to create a high DC voltage (~400V) and then a string inverter is used to converter the DC power to AC power that is compatible with the grid and/or with local loads. The main issue with this configuration is the performance degradation due to partial shading. If one of the PV panels is shaded, the power generation of the entire string is compromised since the PV panels are coupled to each other in series. Also, the PV panels may have different maximum power points due to various reasons such as manufacturing tolerances, etc. Thus, the string inverter cannot guarantee maximum power point tracking (MPPT) for each individual panel and, accordingly, cannot achieve maximum energy harvesting for the solar energy harvesting system. In order to address these issues, other architectures were introduced.

FIG. 2 shows an exemplary arrangement of another power architecture according to the prior art. In FIG. 2, DC optimizers are used at the PV side to individually control each PV panel. The outputs of the DC optimizers are then coupled in series to create a high DC voltage for the DC/AC inverter. This approach is able to solve the issue of partial shading and can provide individual MPPT for each PV panel. However, since the DC optimizers are placed in series, a minimum number of PV panels in a string need to be present and operating to build up enough voltage for the inverter. Also, roof planning (i.e., placement of the PV panels on a roof) may be needed to accommodate this minimum number of panels per string to thereby ensure system reliability. In order to address some of these issues, DC optimizers that are connected in parallel are introduced as illustrated in FIG. 3, again as known in the prior art.

FIG. 4 shows another power system architecture. This architecture is commonly called a microinverter and is known in the prior art. In microinverter systems as known in the prior art, the complete DC to AC power conversion is performed by the microinverter. As shown in FIG. 4, the microinverter usually includes a DC/DC converter on the PV side. The use of a DC/DC converter boosts the voltage and provides galvanic isolation. A DC/AC inverter then receives the DC power and is used to convert this DC power to AC power compatible with the grid and/or with local loads. Microinverter systems can provide individual MPPT for each PV panel and do not require any roof planning since they are placed in parallel at the AC grid side. In order to increase the power capability of microinverters, a quad structure has been introduced as shown in FIG. 5 according to the prior art. In this architecture shown in FIG. 5, since four PV panels meet at a corner or at a common junction point, the quad architecture is well-suited for increasing the power density and for providing high performance for the solar energy harvesting system. This structure can effectively increase power and reduce the overall cost of the solar energy harvesting system. According to the architecture in FIG. 5, multiple DC/DC converters are used at the PV side and a DC/AC inverter is used at the grid side in order to convert DC power to AC power compatible with the grid.

In all of the above architectures, a DC/AC inverter is used as the interface to the AC grid. FIG. 6 shows a schematic diagram of a typical DC/AC inverter according to the prior art. As shown in FIG. 6, a full-bridge inverter is usually used to convert DC power to AC power. The control system of this inverter is responsible for regulating the DC bus voltage at the input side and for shaping the output current to a nearly sinusoidal waveform synchronous with the grid voltage. One of the main issues with this configuration is the use of high voltage semiconductors. Since the peak value of the grid voltage is fairly high (around 380V in North America), the DC bus voltage needs to be designed to support a high voltage. Thus, the power semiconductors used in such inverters are required to withstand high DC voltage (typically 600V or 650V semiconductors are used for this application). Higher voltage semiconductors usually have degraded switching and conduction performance compared to the low voltage semiconductors. For instance, the ON resistance, $R_{DS}(ON)$, of a 600V MOSFET is much higher than six times the ON resistance for a 100V MOSFET (~100 mΩ for a 600V MOSFET and ~4 mΩ for a 100V MOSFET). In order to use low voltage semiconductors with higher performance, multi-level converters are usually used. FIG. 7 shows the schematic diagram of a leg of a typical multi-level inverter with flying capacitors according to the prior art. It should be noted that multi-level inverters with flying capacitors are commonly used in industry for high power applications (~hundreds of kW). One of the main challenges in multi-level inverters with flying capacitors is the need to maintain voltage balance for the flying capacitors. Another issue is that, in existing multi-level inverters with flying capacitors, the DC bus voltage is considered an infinite bus. While this is a reasonable assumption for high power applications, for lower power applications such as PV microinverters, this assumption is no longer valid.

Based on the above, there is therefore a need for systems and devices which mitigate if not avoid the shortcomings of the prior art.

SUMMARY

The present invention relates to a DC/AC inverter and to microinverter architectures using the DC/AC inverter. The DC/AC inverter is based on a differential geometry control scheme to balance and optimize the flying capacitor voltages across the flying capacitors used in the inverter's power circuit. Based on changing inverter and overall system conditions, including capacitor voltages, grid voltages, grid current, and DC bus voltages, desired fields are generated. These fields are used to balance capacitor voltages such that capacitor voltage values converge, over time, to an optimal solution.

In a first aspect, the present invention provides a system for converting DC power to AC power suitable for an AC power grid, said DC power coming from either at least one PV panel or an energy storage subsystem, the system comprising:
- a plurality of DC/DC converters, each of said plurality of DC/DC converters being for receiving DC power from at least one PV panel and for performing maximum power point tracking for said at least one PV panel;
- a DC/AC inverter for receiving DC power from said plurality of DC/DC converters and for converting said DC power into AC power for use by said power grid; and
- a differential geometry controller for controlling said DC/AC inverter and for coordinating and controlling said plurality of DC/DC converters.

In a second aspect, the present invention provides a DC/AC inverter comprising:
- a power circuit for converting incoming DC power into AC output power suitable for use with an AC power grid, said power circuit comprising at least one semiconductor;
- a control system comprising:
  - a differential geometric controller for determining vector fields necessary such that voltages of flying capacitors in said power circuit, over time, converge to an optimum value, wherein said differential geometric controller receives, as inputs, said voltages of said flying capacitors in said power circuit and produces data detailing desired vector fields;
  - a current controller receiving grid operating conditions for said power grid and producing data detailing a duration of application for said desired vector fields, said data being based on said grid operating conditions; and
  - a geometric modulator receiving said data detailing desired vector fields and data detailing said duration of application for said desired vector fields, said geometric modulator producing switching pulses for said at least one semiconductor in said power circuit based on said desired vector fields and on said duration of application for said desired vector fields.

In a third aspect, the present invention provides a system for converting DC power to AC power suitable for an AC power grid, said DC power coming from either at least one PV panel or an energy storage subsystem, the system comprising:
- a DC/DC low voltage converter for producing output DC power from received from at least one PV panel, said output DC power being for charging an energy storage subsystem;
- a bi-directional high voltage DC/DC converter for converting low voltage DC power from said energy storage subsystem into high voltage DC power, said high voltage DC/DC converter being coupled to said energy storage subsystem;
- a DC/AC inverter receiving high voltage DC power from said high voltage DC/DC converter, said DC/AC inverter being for converting said high voltage DC power from said high voltage DC/DC converter into AC power suitable for use with said AC power grid, said DC/AC inverter being coupled between said high voltage DC/DC converter and said grid; and
- a control system for controlling parameters across components of said system.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
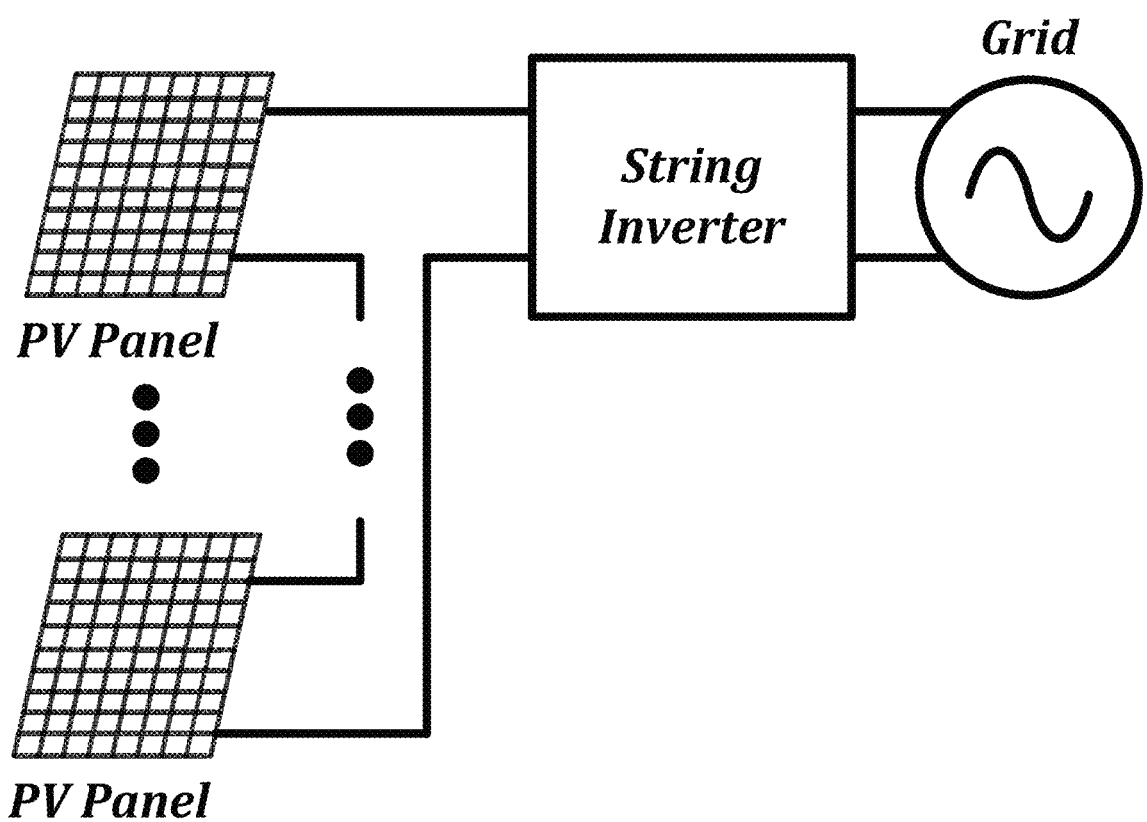
FIGS. 1-7 are diagrams illustrating systems according to the prior art.
Figure 2:
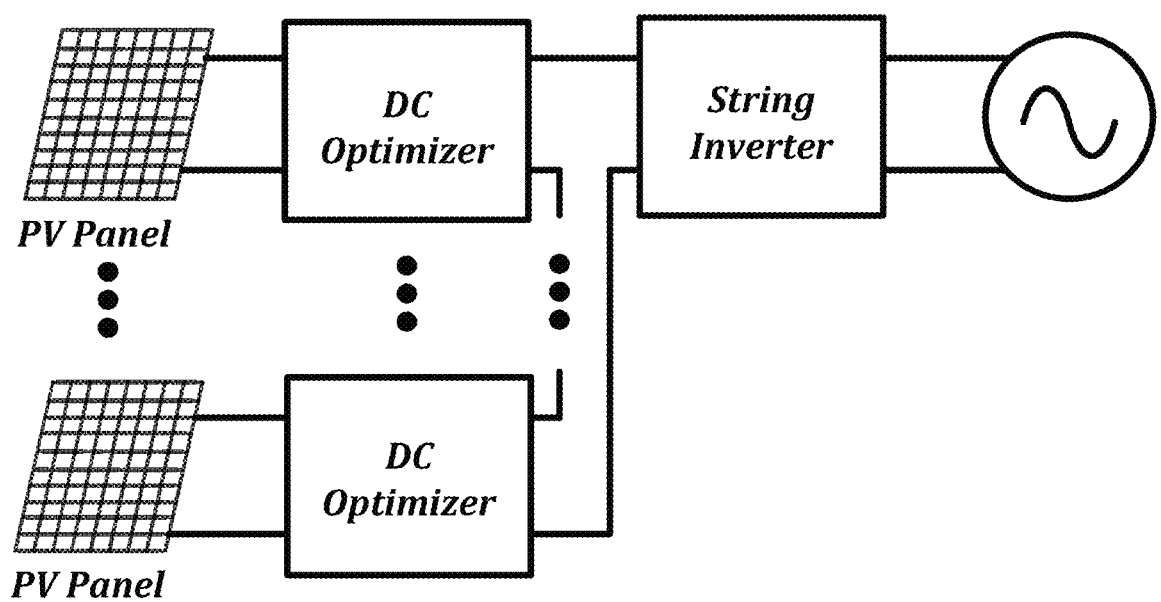
Figure 3:
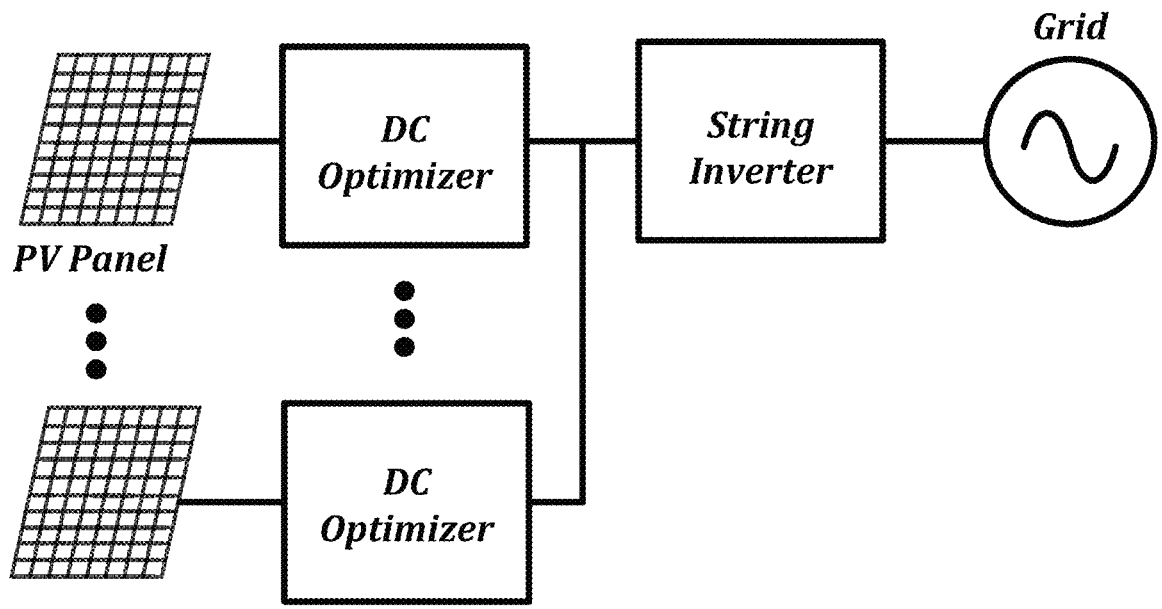
Figure 4:
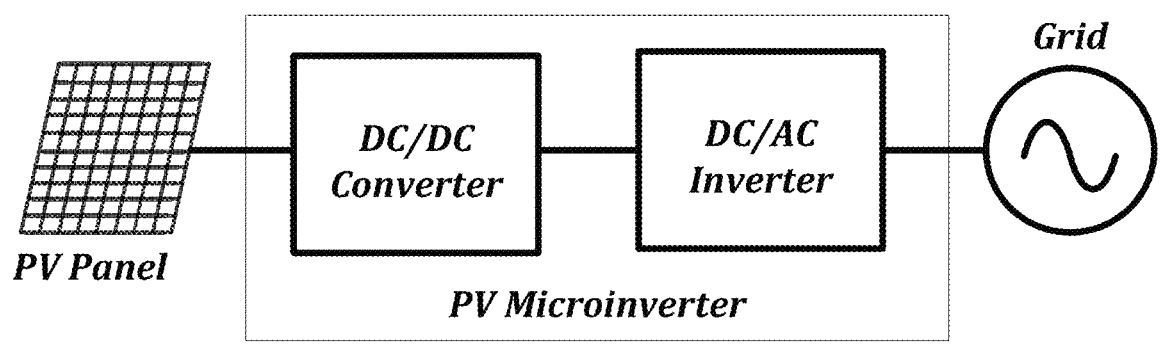
Figure 5:
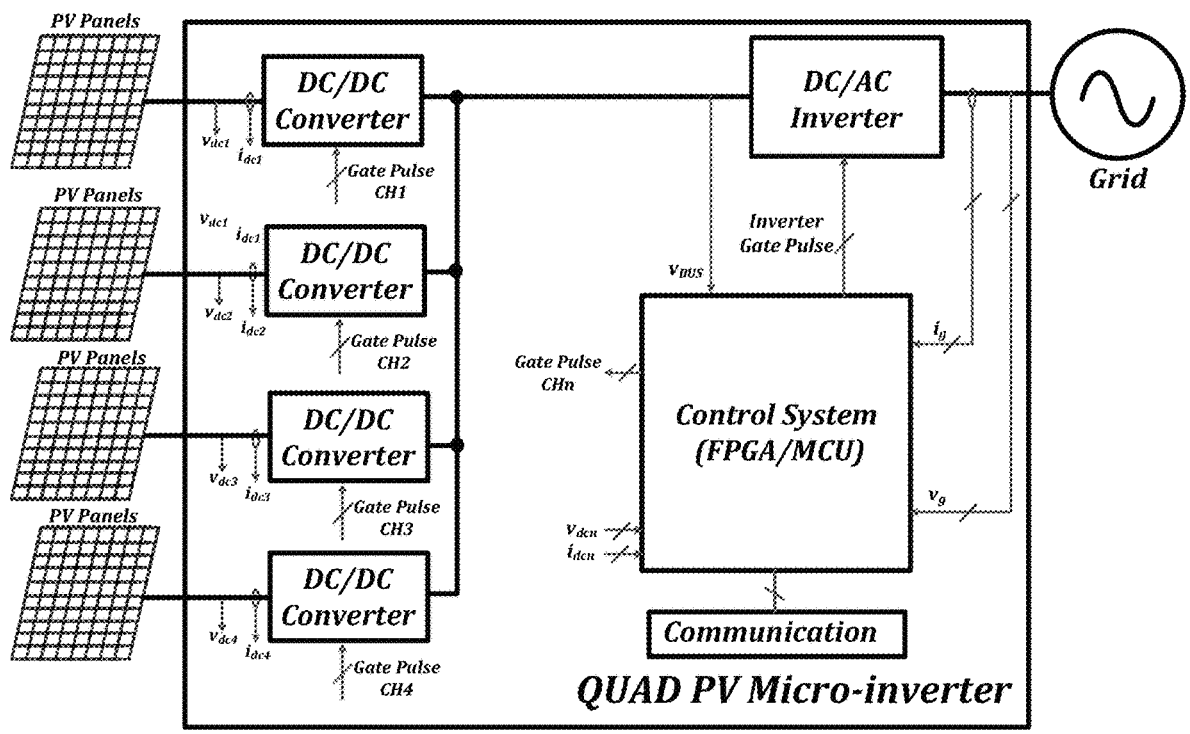
Figure 6:
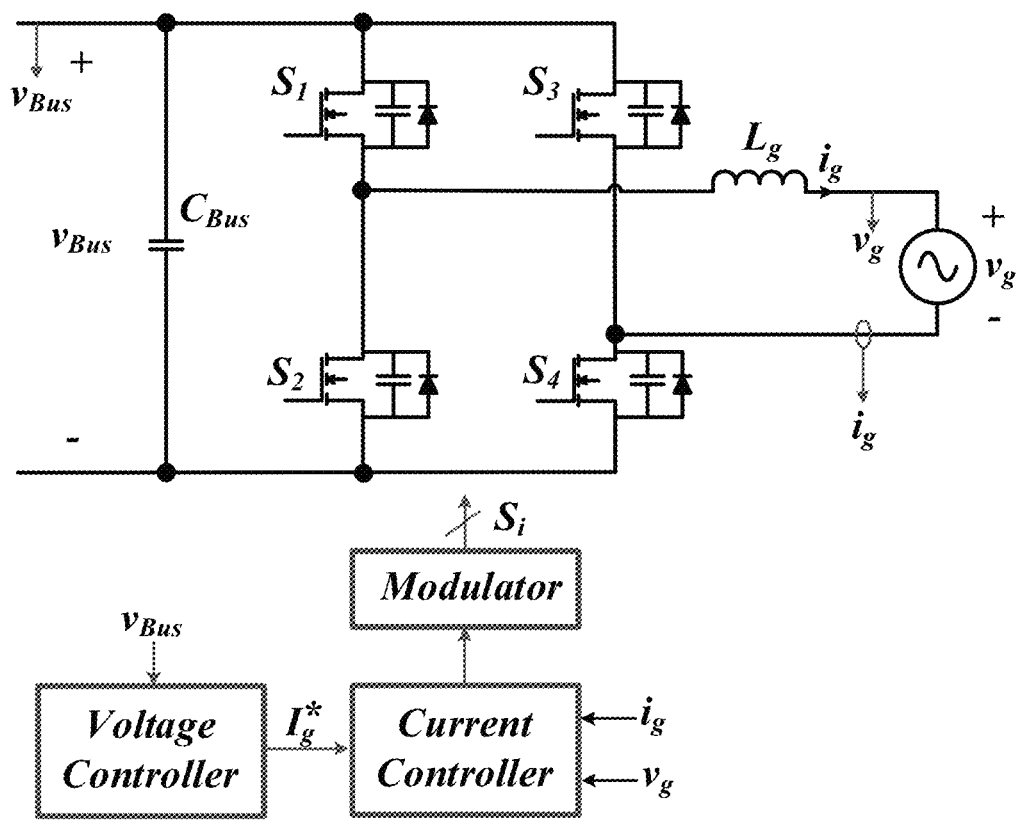
Figure 7:
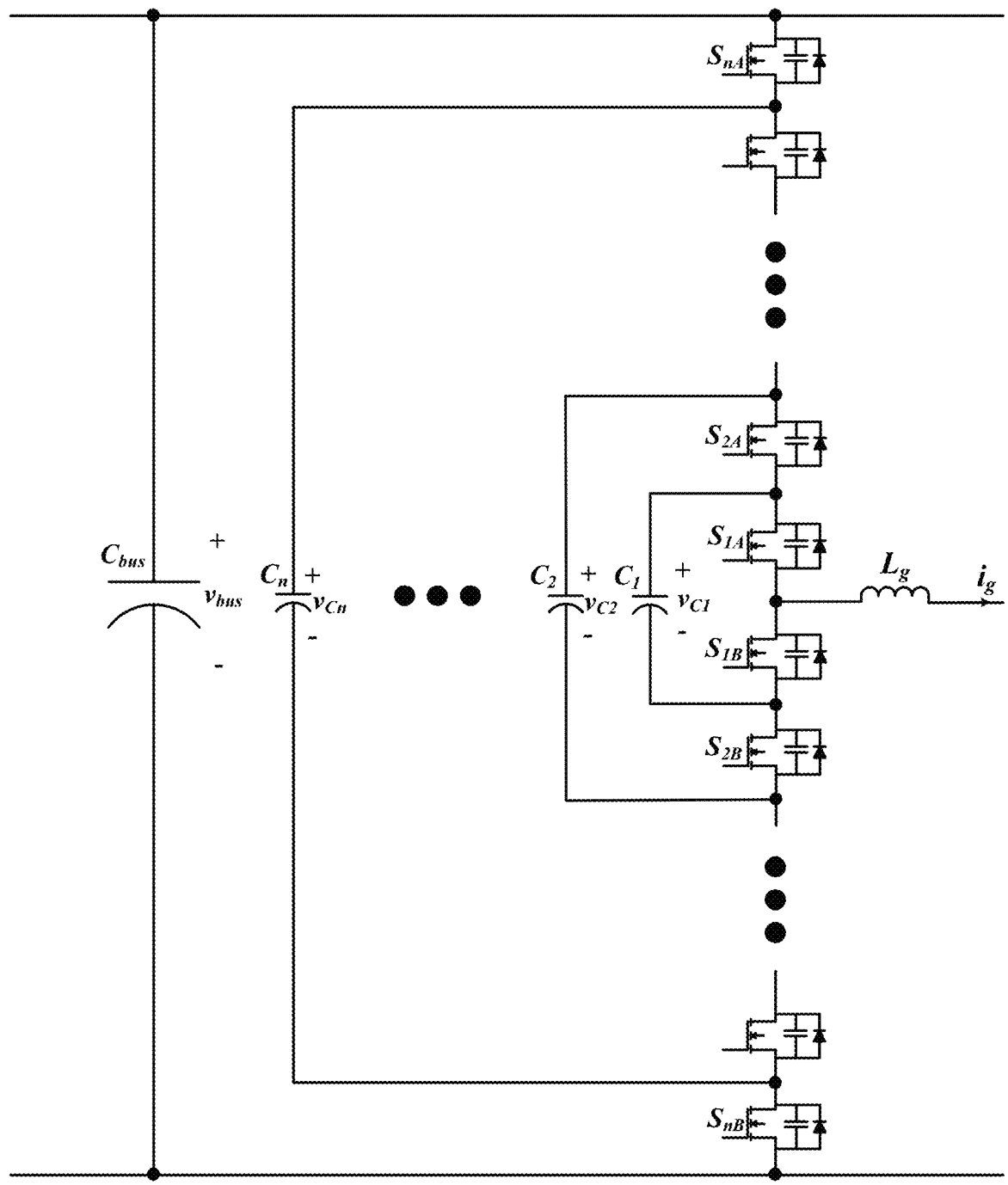
Figure 8:
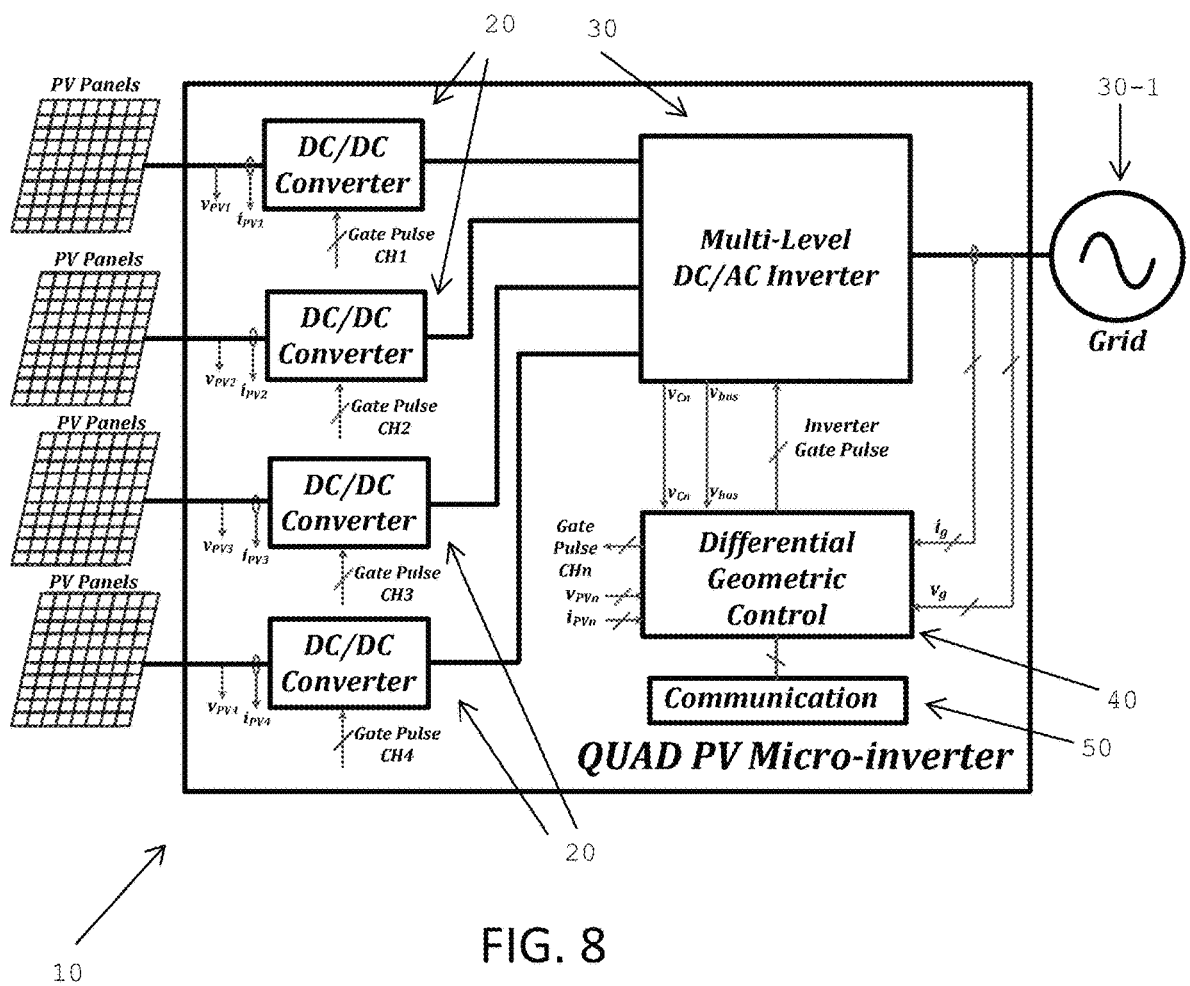
FIG. 8 is a block diagram of a microinverter system according to one aspect of the present invention.

Referring to FIG. 8, a block diagram of a multi-input PV microinverter according to one aspect of the present invention is shown. As can be seen from FIG. 8, the micro-inverter system 10 includes the following blocks:
- multiple DC/DC converter blocks 20 for performing maximum power point tracking for the PV panels;
- a multi-level DC/AC inverter block 30 used to convert the DC power to AC power compatible with the utility grid 30-1 and local loads;
- a differential geometric control block 40 for controlling the DC/DC converters and the multi-level DC/AC inverter in order to achieve certain control tasks such as maximum power point tracking (MPPT) for the PV panels, controlling the power quality at the grid side, etc., and
- a communication system 50 for communicating between the micro-inverter and external equipment.

Figure 9A:
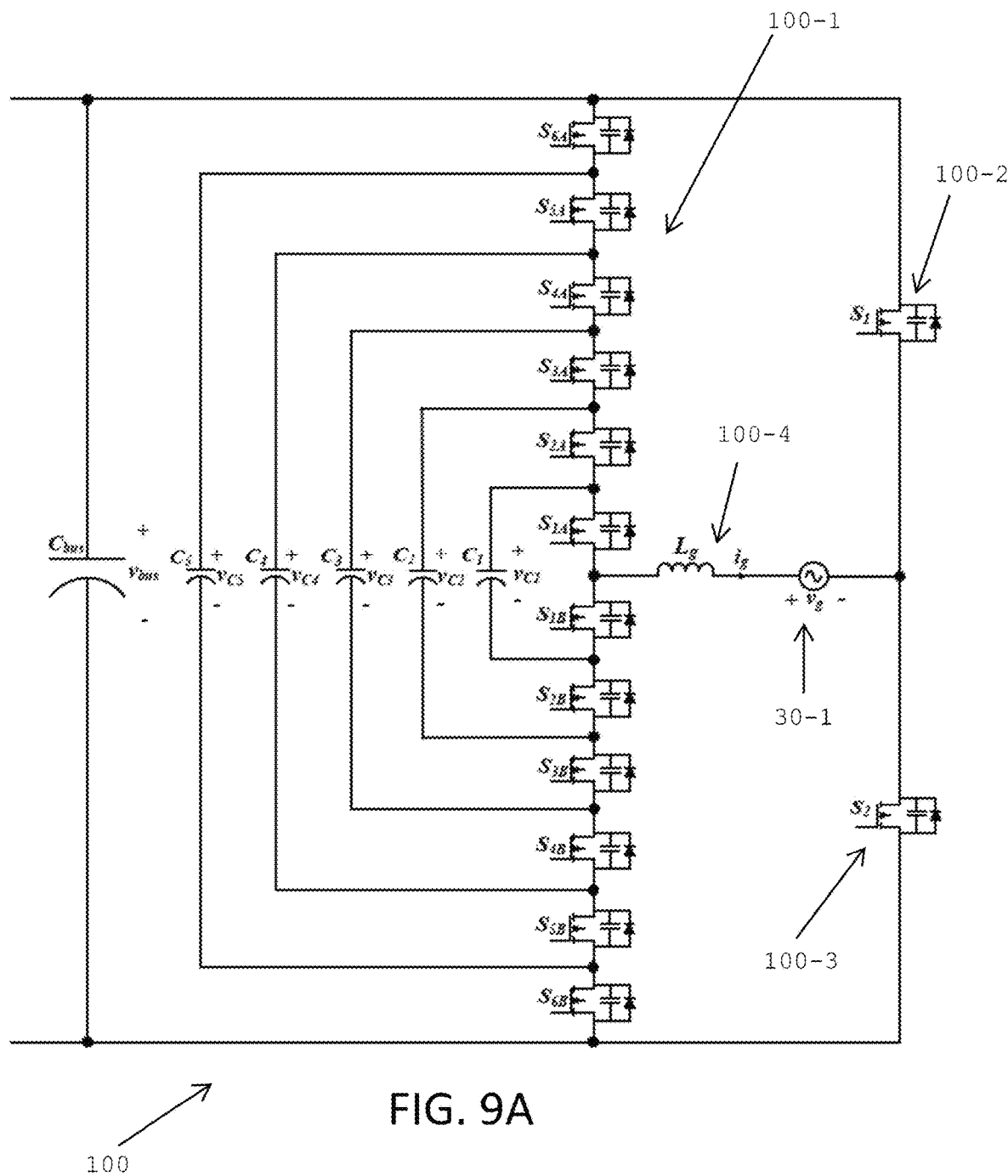
FIGS. 9A-9B are diagrams illustrating the power circuit and the controller system for a DC/AC inverter according to another aspect of the present invention.
Figure 9B:
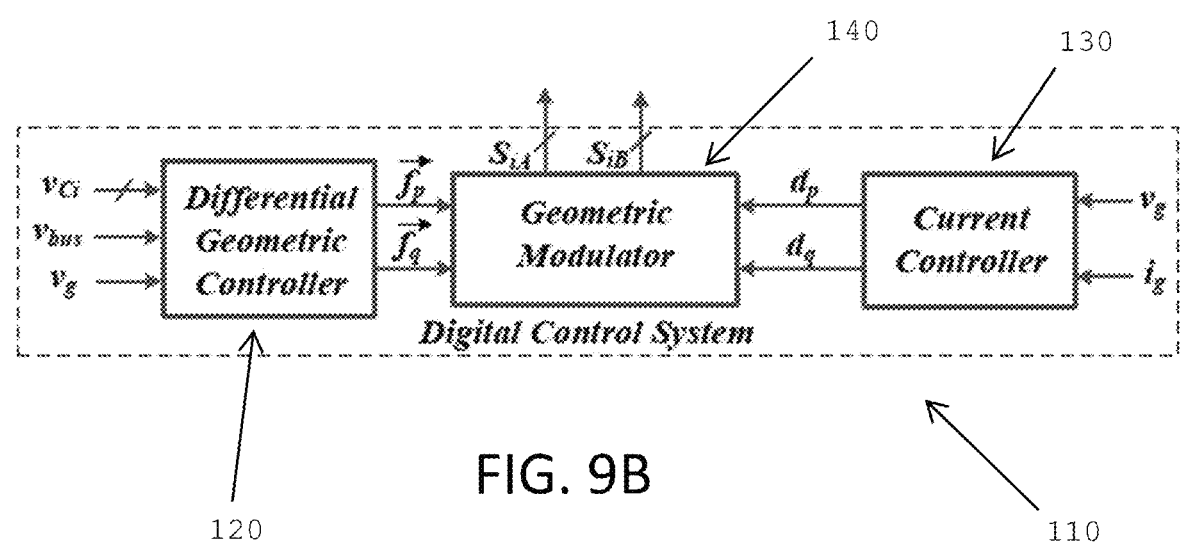

The DC/AC inverter block 30 in FIG. 8 may have a configuration as shown in FIG. 9A and FIG. 9B. Referring to both FIG. 9A and FIG. 9B, a block diagram of a configuration for a totem-pole multi-level DC/AC inverter with differential geometric controller according to one aspect of the present invention is illustrated. As can be seen from FIG. 9A and FIG. 9B, this totem-pole multi-level DC/AC inverter 30 includes:
- a multi-level DC/AC inverter power circuit 100, which is responsible for converting DC power to AC power (shown in FIG. 9A); and a digital control system block 110 (shown in FIG. 9B), which includes:
  a differential geometric controller block 120, which determines appropriate vector fields for the modulator;
  a current controller block 130, which determines appropriate duty ratios for the respective vector fields; and
  a geometric modulator block 140, which generates appropriate gate pulses for the multi-level DC/AC inverter.

As can be seen from FIG. 9A, the inverter power circuit 100 includes a number of circuit element modules and a number of flying capacitors, with each circuit element module including a semiconductor, a diode, and a capacitor. For each circuit element module, the diode and capacitor are coupled in parallel with the semiconductor. Most of the circuit element modules are paired with one another. The paired circuit element modules are coupled as a single chain 100-1 in a series configuration with each pair of circuit element modules being associated with a specific flying capacitor. The associated flying capacitor is coupled to be in parallel with its associated pair of circuit element modules. Thus, a flying capacitor is coupled between a first and a second coupling point on the chain, and the pair of circuit element modules that is associated with the flying capacitor is coupled in series (to each other or to other modules) between the first and second coupling points. As can be seen, other circuit element modules may also be between those first and second coupling points. The flying capacitors associated with each pair of circuit element modules are detailed in the table below:

| Flying Capacitor | First circuit element module in the pair | Second circuit element module in the pair |
| --- | --- | --- |
| $C_1$ | $S_{1A}$ | $S_{1B}$ |
| $C_2$ | $S_{2A}$ | $S_{2B}$ |
| $C_3$ | $S_{3A}$ | $S_{3B}$ |
| $C_4$ | $S_{4A}$ | $S_{4B}$ |
| $C_5$ | $S_{5A}$ | $S_{5B}$ |
| $C_{bus}$ | $S_{6A}$ | $S_{6B}$ |

Again, referring to FIG. 9A, in parallel with the chain 100-1 of circuit element modules are two output modules 100-2, 100-3 coupled in series with each other. Midway along the chain 100-1 of modules is an output inductor 100-4. The output of the power circuit is taken between the output inductor 100-4 and a coupling point that is between the output modules 100-2, 100-3. This output is the output to the grid 30-1.

Figure 10A:
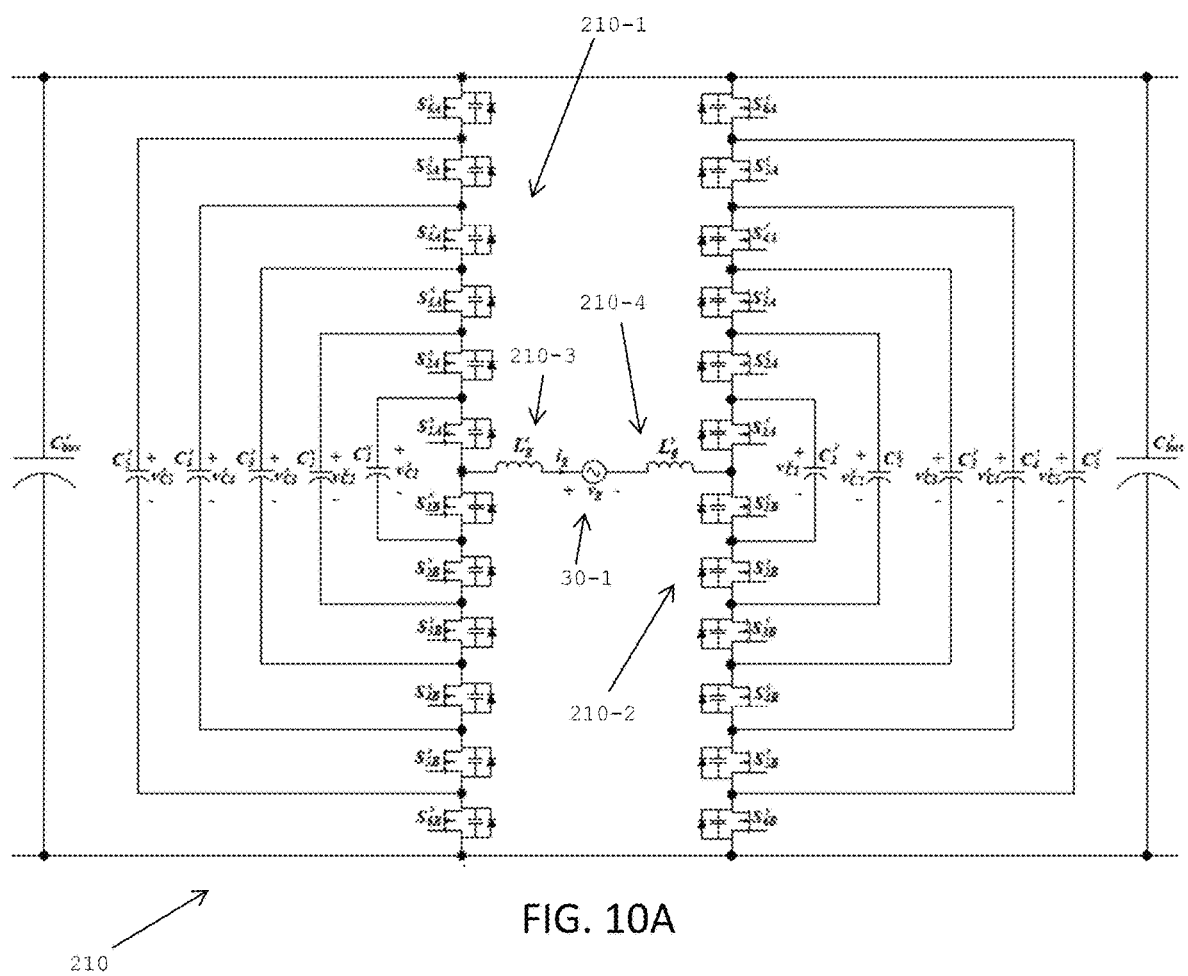
FIG. 10A-10B are diagrams illustrating the power circuit and the controller system for a DC/AC inverter according to a further aspect of the present invention.
Figure 10B:
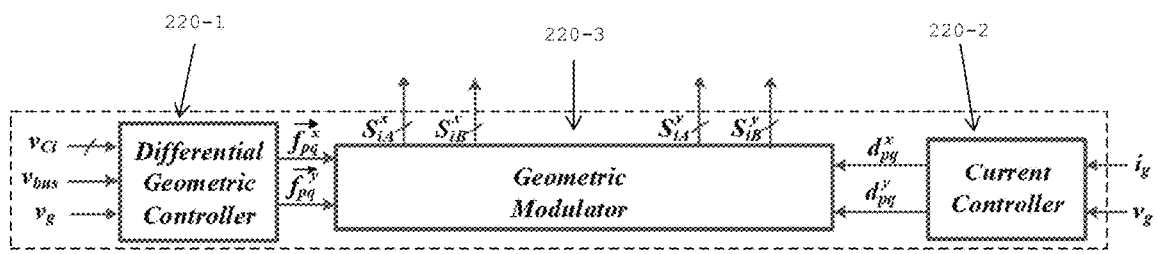

Referring to FIG. 10A and FIG. 10B, illustrated are block diagrams of an exemplary arrangement for another multi-level DC/AC inverter 200 that uses a differential geometric controller. The power circuit 210 of this DC/AC inverter 200 is illustrated in FIG. 10A while the controller 220 is shown in FIG. 10B. As can be seen, the totem-pole multi-level DC/AC inverter 200 includes:
  a multi-level DC/AC inverter power circuit 210 (illustrated in FIG. 10A), which is responsible for converting DC power to AC power, and
  a digital control system block 220 (shown in FIG. 10B), which includes:
    a differential geometric controller block 220-1, which determines appropriate vector fields for the modulator;
    a current controller block 220-2, which determines appropriate duty ratios for the respective vector fields; and
    a geometric modulator block 220-3, which generates appropriate gate pulses for the multi-level DC/AC inverter.

Referring to FIG. 10A, it can be seen that, instead of a single chain of circuit element modules, there are two chains 210-1, 210-2. Each chain of circuit element modules has a single chain of series-coupled circuit element modules, with each circuit element module being paired with another circuit element module. For each pair of paired circuit element modules, there is associated a specific flying capacitor and each specific flying capacitor is coupled in parallel to its associated pair of modules. Thus, each flying capacitor is coupled between a first and a second coupling point on the chain, and the pair of circuit element modules that is associated with that flying capacitor is coupled in series (to each other or to other modules) between the first and second coupling points. As can be seen, other circuit element modules may also be between those first and second coupling points. The flying capacitors associated with each pair of circuit element modules on the first chain of modules 210-1 (the chain of modules on the left) are detailed in the table below:

| Flying Capacitor | First circuit element module in the pair | Second circuit element module in the pair |
| --- | --- | --- |
| $C^x1$ | $S^x1A$ | $S^x1B$ |
| $C^x2$ | $S^x2A$ | $S^x2B$ |
| $C^x3$ | $S^x3A$ | $S^x3B$ |
| $C^x4$ | $S^x4A$ | $S^x4B$ |
| $C^x5$ | $S^x5A$ | $S^x5B$ |
| $C^xbus$ | $S^x6A$ | $S^x6B$ |

For the second chain of modules 210-2 (the chain of modules on the right), the flying capacitors associated with each pair of circuit element modules are detailed capacitors associated with in the table below:

| Flying Capacitor | First circuit element module in the pair | Second circuit element module in the pair |
| --- | --- | --- |
| $C^y_1$ | $S^y_{1A}$ | $S^y_{1B}$ |
| $C^y_2$ | $S^y_{2A}$ | $S^y_{2B}$ |
| $C^y_3$ | $S^y_{3A}$ | $S^y_{3B}$ |
| $C^y_4$ | $S^y_{4A}$ | $S^y_{4B}$ |
| $C^y_5$ | $S^y_{5A}$ | $S^y_{5B}$ |
| $C^y_{bus}$ | $S^y_{6A}$ | $S^y_{6B}$ |

As can also be seen from FIG. 10A, each of the two chains 210-1, 210-2 has an output inductor 210-3, 210-4 coupled to a coupling point that is in the middle of each chain. Each of these two inductors 210-3, 210-4 is coupled between the grid 30-1 and the coupling point midway in the associated chain of modules. Of course, as can be seen, each of the two chains 210-1, 210-2 is coupled in parallel to the other chain.

Figure 11B:
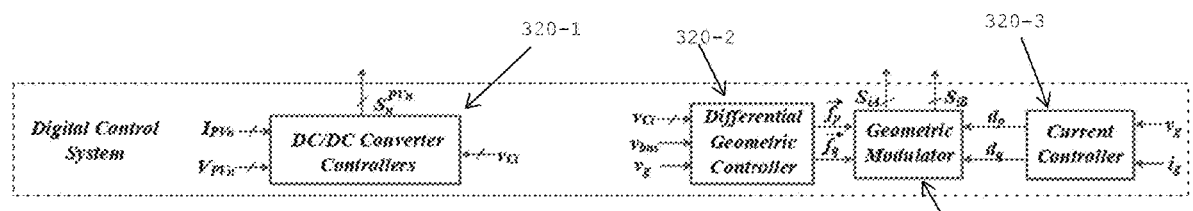
FIG. 11A-11B are diagrams illustrating a microinverter using the DC/AC inverter illustrated in FIG. 9A and FIG. 9B.
Figure 11A:
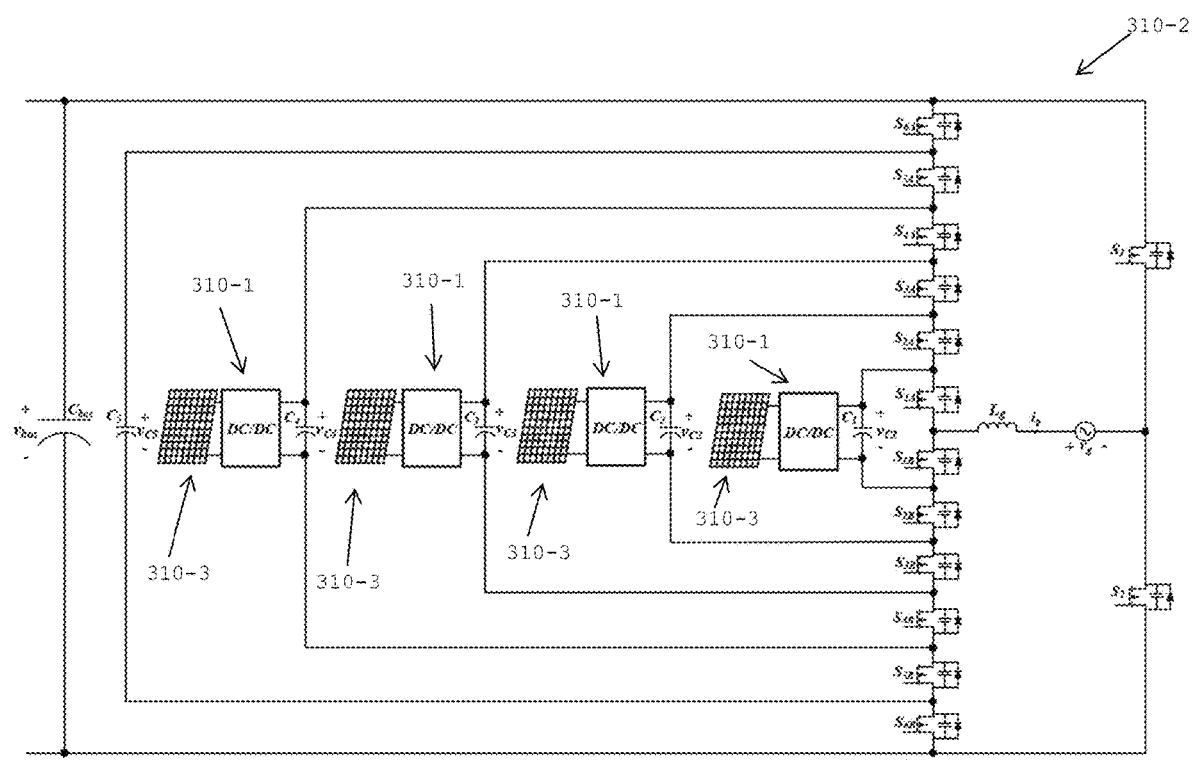

Referring to FIG. 11A and FIG. 11B, shown is a block diagram of a further configuration for micro-inverter 300 with a multi-level DC/AC inverter. As can be seen from FIG. 11A and FIG. 11B, the micro-inverter 300 includes:
  multiple DC/DC converter blocks 310-1 (shown in FIG. 11A), which are responsible for performing maximum power point tracking for the PV panels and boost the voltage to the level needed for the flying capacitors;

a multi-level DC/AC inverter power circuit 310-2 (shown in FIG. 11A), which is responsible for converting DC power to AC power; and a digital control system block 320 (shown in FIG. 11B), which includes:
- a DC/DC converter controller block 320-1, which is responsible for controlling the DC/DC converters in order to achieve maximum power point tracking;
- a differential geometric controller block 320-2, which determines appropriate vector fields for the modulator:
- a current controller block 320-3, which determines appropriate duty ratios for the respective vector fields; and
- a geometric modulator block 320-4, which generates appropriate gate pulses for the multi-level DC/AC inverter.

In the configuration illustrated in FIG. 11A, the power circuit used in the DC/AC inverter is the same as that shown in FIG. 9. However, for the power circuit shown in FIG. 11A, for at least some of the flying capacitors, there is coupled in parallel a DC/DC converter block 310-1. And, coupled in parallel to each DC/DC converter block is a corresponding PV panel 310-3. Note that not all the flying capacitors are coupled to a DC/DC converter/PV panel arrangement.

Figure 12:
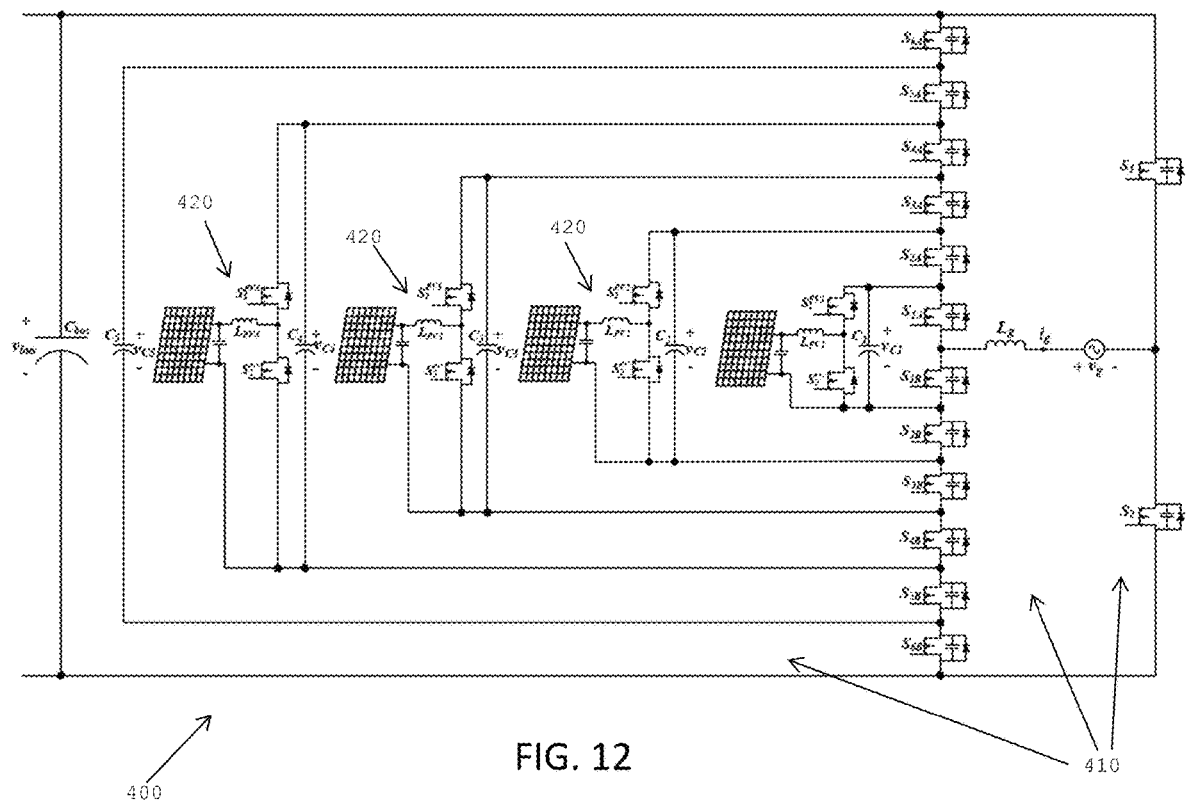
FIG. 12 is a diagram showing a variant of the microinverter illustrated in FIG. 11A and FIG. 11B.

Referring to FIG. 12, illustrated is a block diagram of a micro-inverter that uses a variant of the power circuit used in the micro-inverter shown in FIG. 11. As with the micro-inverter in FIG. 11, this micro-inverter 400 is also equipped with a multi-level DC/AC inverter 410. The digital control system block for this variant is the same as that for the micro-inverter in FIG. 11. However, for this variant, buck converters 420 are used as DC/DC converters to perform maximum power point tracking for the PV panels and to boost the voltage to appropriate levels for the inverter's flying capacitors.

As can be seen in FIG. 12, each buck converter includes two circuit element modules coupled in series and this arrangement of series-coupled modules are coupled to be in parallel with a flying capacitor. A PV panel is coupled at one end to an inductor that is, at its other end, coupled to a coupling point between the series-coupled modules.

At the other end of the PV panel, the PV panel is coupled to one end of the arrangement of series-coupled modules. A capacitor is coupled between the two ends of the PV panel.

Figure 13:
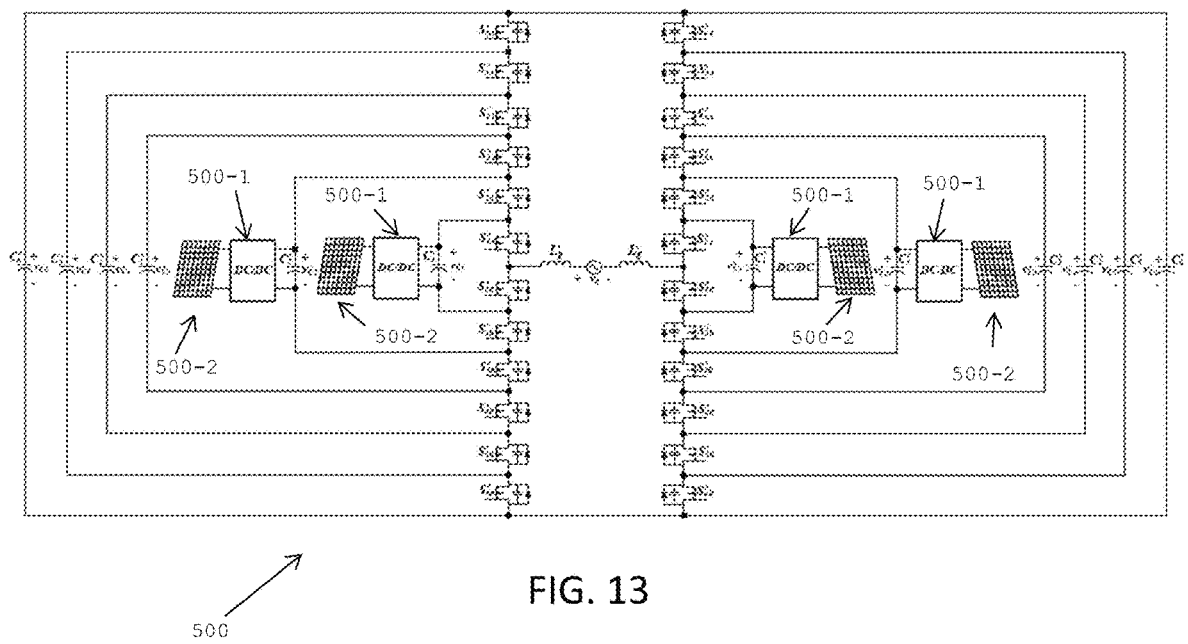
FIG. 13 is a diagram illustrating a microinverter using the DC/AC inverter illustrated in FIG. 10A and FIG. 10B.

Referring to FIG. 13, illustrated is a block diagram for micro-inverter that uses a variant of the power circuit shown in FIG. 10A. The digital system control block for this micro-inverter 500 would be similar in configuration and components as the controller block illustrated in FIG. 11B. For this micro-inverter, two flying capacitors on the left chain of modules have DC/DC converter blocks coupled in parallel with the flying capacitors. Similarly, on the right chain of modules, two flying capacitors have DC/DC converters coupled in parallel with the flying capacitors. The DC/DC converter blocks 500-1 are coupled in parallel to the flying capacitors and are also coupled in parallel with a corresponding PV panel 500-2. The presence of the DC/DC converter blocks is, preferably but not necessarily, balanced between the left chain of modules and the right chain of modules. For an optimal and balanced approached, the number of DC/DC converter blocks (and their corresponding PV panels) on the left chain of modules corresponds to the number of DC/DC converter blocks on the right chain of modules. Preferably, to allow the usage of the same MOSFETs in the circuit element modules, the number of flying capacitors on the left chain matches the number of flying capacitors on the right chain. However, the number of DC/DC converters coupled in parallel to flying capacitors need not be balanced. Symmetry between the left chain and the right chain, in terms of the number of DC/DC converters, is preferable but not necessary. With such symmetry, if flying capacitor C'' has a DC/DC converter block, then the corresponding flying capacitor on the other side C'a must also have a corresponding DC/DC converter block. As noted above, unbalanced/asymmetric configurations are also possible (e.g., 2 flying capacitors on the left chain have DC/DC converters while 3 flying capacitors on the right chain have DC/DC converters). For the system illustrated in FIG. 13, a balanced approach is used as flying capacitors $C^y_1$, $C^y_2$, $C'^y_1$, $C'^y_2$ all have DC/DC converter blocks coupled in parallel.

Figure 14:
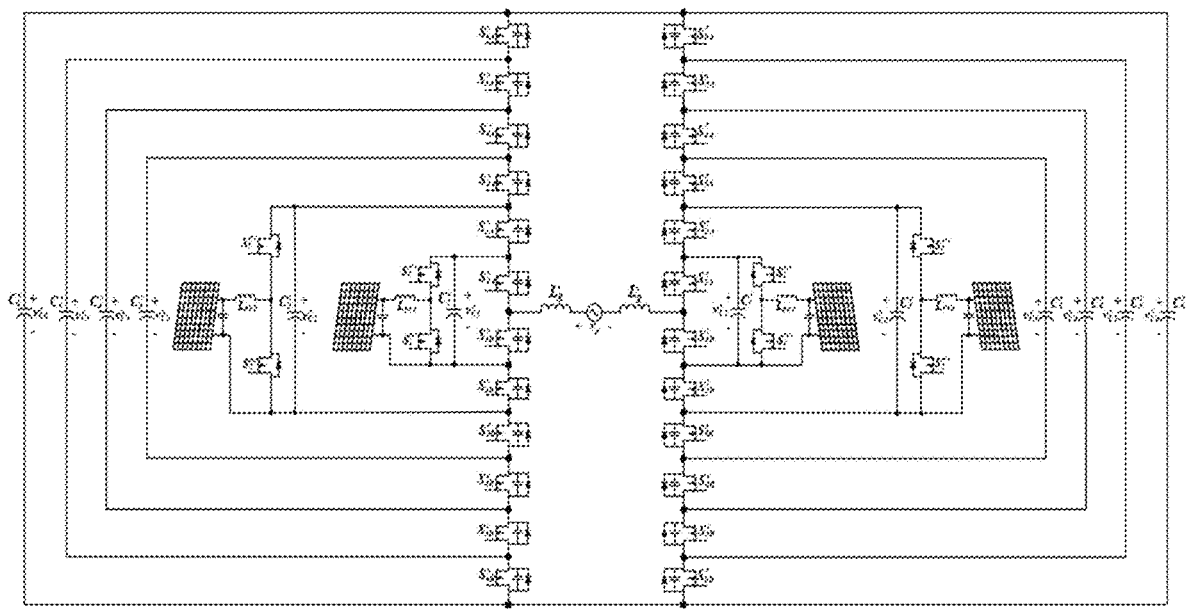
FIG. 14 is a diagram showing a variant of the microinverter illustrated in FIG. 13.

Referring to FIG. 14, illustrated is a block diagram of a variant of the micro-inverter illustrated in FIG. 13. As can be seen, in FIG. 14, buck converters are used as the DC/DC converter blocks in FIG. 13. In FIG. 14, the buck converters are used as DC/DC converters to perform maximum power point tracking for the PV panels and to boost the voltage to appropriate levels for the inverter's flying capacitors. As with the buck converters in FIG. 12, each buck converter in FIG. 14 includes two circuit element modules coupled in series and this arrangement of series coupled modules are coupled to be in parallel with a flying capacitor. Each buck converter includes an inductor that is coupled between a PV panel and a coupling point between the series coupled modules. The PV panel, is also coupled to a coupling point on the chain of modules. A capacitor is coupled between the two coupling points of the PV panel.

Figure 15:
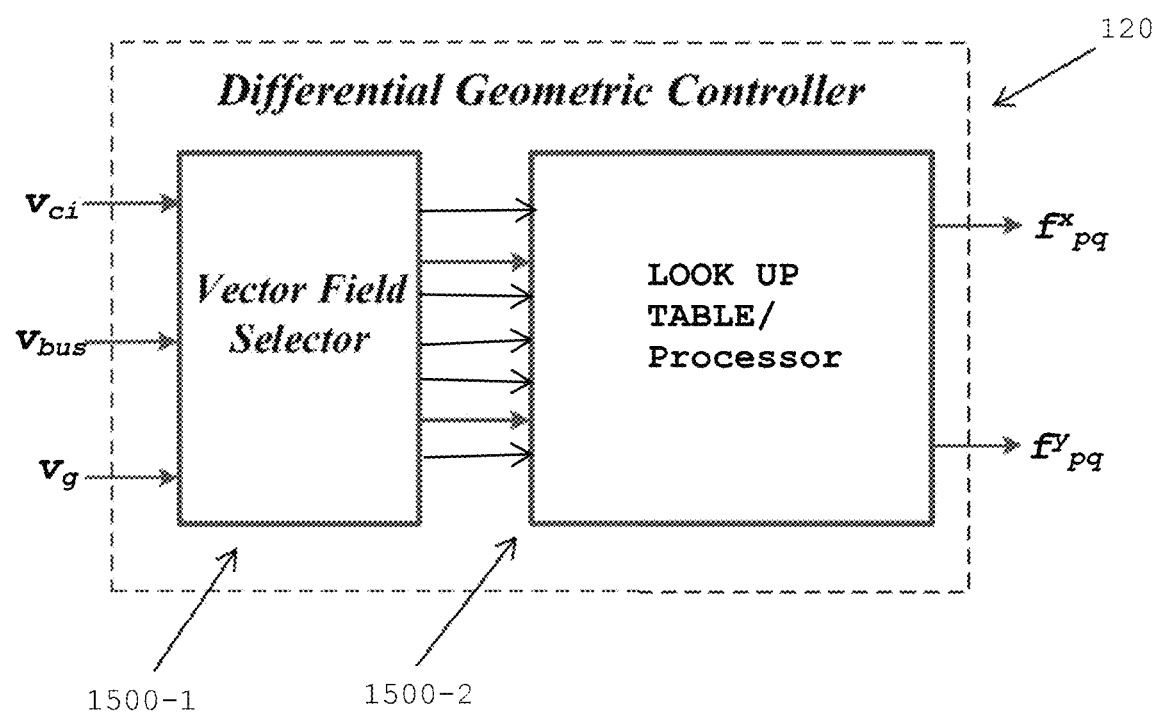
FIG. 15 is a block diagram showing the components in a differential geometric controller as used in the systems and components of the various aspects of the present invention.

It should be clear that the DC/AC inverter detailed above uses a differential geometric controller, a geometric modulator, and a current controller in the inverter's controller block. The functions of these components are as detailed above. Referring to FIG. 15, a block diagram of the differential geometric controller block 120 is illustrated. The differential geometric controller block 120 has a vector field selector block 1500-1 and a vector field generation block 1500-2. The vector field selector block 1500-1 determines what vector fields are necessary given the input while the vector field generation block 1500-2 determines the components of those desired vector fields. As can be seen, the vector field selector block 1500-1 receives multiple inputs. For this case, these multiple inputs include the flying capacitors' voltages (i.e., $v_{C1}$, $v_{C2}$, $v_{C3}$, etc.), the bus voltage ($v_{bus}$), and the grid voltage ($v_g$). The differential geometric controller block 120, as a whole, produces the appropriate vector fields that need to be applied in order to maintain the voltages of the flying capacitors within appropriate levels. The vector field generation block 1500-2 uses a look-up table to determine the components of the desired vector fields as shown in FIG. 8. However, in some implementations, the look-up table can be replaced with a suitably programmed data device/processor to calculate the components of the desired vector fields.

In terms of function, the differential geometric controller 120 selects an appropriate vector field based on the location of the operating point on the configuration space of the system. The vector fields are selected such that the flying capacitors' voltages converge to their nominal values. The differential geometric controller 120 switches the vector fields such that they point to the pre-defined intervals for the capacitor voltages.

Figure 16:
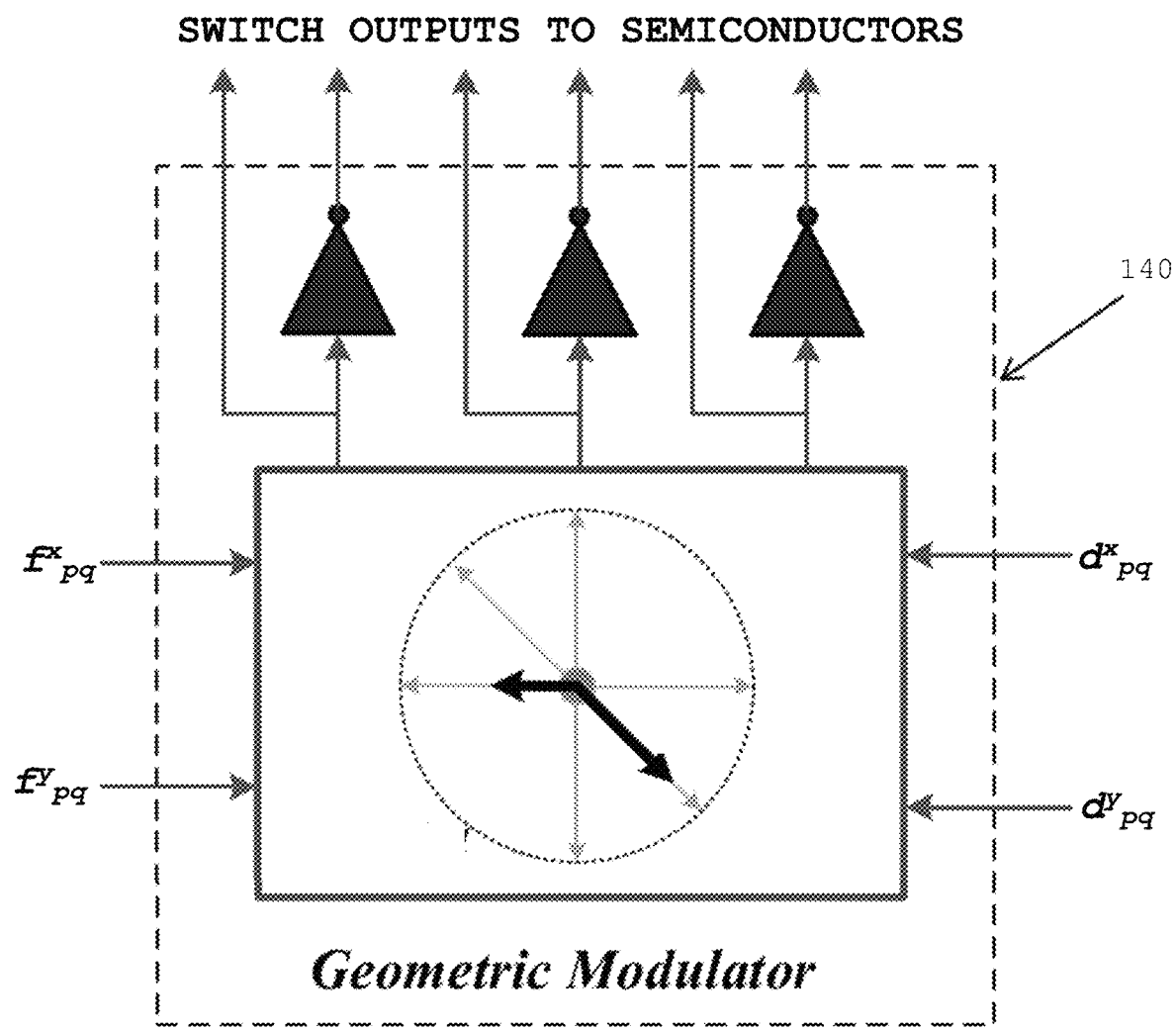
FIG. 16 is a block diagram of a geometric modulator as used in the systems and components of the various aspects of the present invention.

To generate the desired vector fields, the geometric modulator 140 receives the desired vector fields from the differential geometric controller 120 and the duration of these fields from the current controller 130. Based on the desired vector fields and the duration of these fields, the geometric modulator 140 produces pulses for the various semiconductors in the power circuit. FIG. 16 shows a block diagram of the geometric modulator 140. It should be clear that the geometric modulator 140 produces two signals for each pair of circuit element modules—one signal for each semiconductor in each pair of circuit element modules. As can be seen, the two signals are opposite to one another. Accordingly, as an example, the signal for semiconductor $S_{1A}$ will be the opposite to the signal for the semiconductor $S_{1B}$. Note that all the outputs of the geometric modulator are not detailed in FIG. 16.

FIG. 16 shows that the respective vector fields (i.e. $f^x_{pq}$ and $f^y_{pq}$) generated by the differential geometric controller 120 are received by the geometric modulator block 140. This block 140 also receives the durations for which the respective vector fields should be applied (i.e., $d^x_{pq}$ and $d^y_{pq}$). Based on these inputs, the block 140 generates appropriate switching pulses for the power semiconductors in the power circuit. The durations $d^x_{pq}$ and $d^y_{pq}$ are generated by the current controller block 130 based on its inputs from the grid (i.e., $i_g$ and $v_g$).

Figure 17:
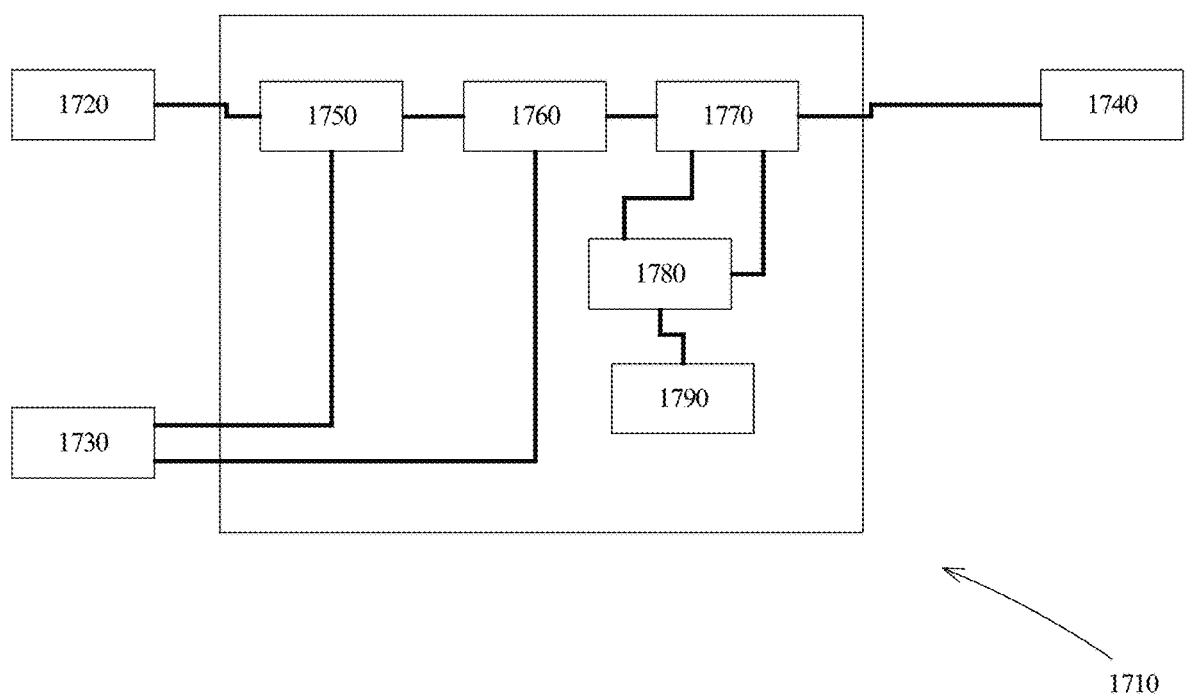
FIG. 17 is a general block diagram illustrating the components in a microinverter with energy storage according to another aspect of the present invention.

Such a multi-level DC/AC inverter as shown in the figures and detailed above may also be used in other microinverter architectures. As an example, such a differential geometry-based inverter may be used in a microinverter architecture such as that illustrated in FIG. 17. As can be seen from FIG. 17, the system 1710 couples to at least one PV panel 1720, an energy storage unit 1730, and to a power grid 1740. The system 1710 includes a low voltage (LV) DC/DC converter 1750 that receives DC power from the PV panels 1720 and converts this DC power into DC power suitable for the energy storage unit 1730. The LV DC/DC converter 1750 feeds the converted DC power to the energy storage unit 1730 to charge the unit 1730. The system 1710 also includes a bidirectional high voltage (HV) DC/DC converter 1760 that is coupled to the energy storage unit 1730. The HV DC/DC converter 1760 converts the low voltage DC power it receives from the energy storage unit 1730 into high voltage DC power suitable for a DC/AC inverter 1770. The HV DC/DC converter also controls the power flow to and from the energy storage unit 1730. The HV DC/DC converter 1760 controls whether the energy storage unit 1730 is being charged or not. As noted in the Figure, the system 1710 includes a DC/AC inverter 1770 that receives high voltage DC power from the HV DC/DC converter 1760. The DC/AC inverter 1770 produces AC power from the high voltage DC power and feeds this AC power to the grid 1740. A control system 1780 controls the various components of the system 1710. A communications subsystem 1790 communicates with the control system 80 to receive commands and send back readings as needed to external components/users.

Figure 18:
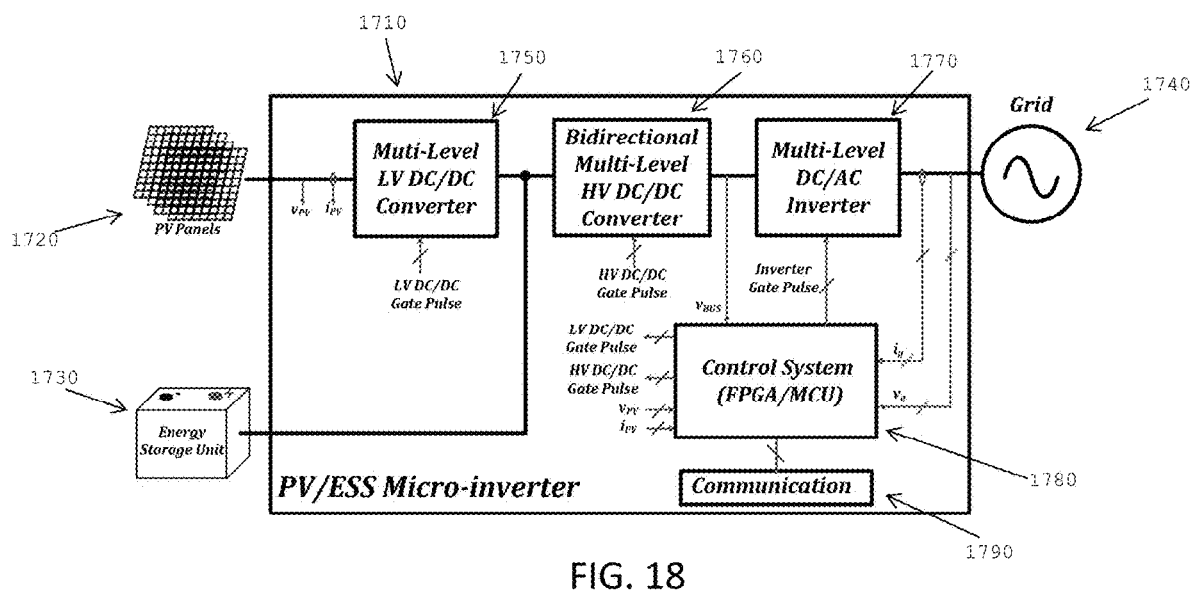
FIG. 18 is a more detailed diagram illustrating the inputs and outputs of the various components of the system illustrated in FIG. 17.

Referring to FIG. 18, a block diagram of one implementation of a micro-inverter according to one aspect of the present invention is illustrated. As can be seen, FIG. 18 shows the inputs and outputs of the various components of the system 1710.

In one implementation, the LV DC/DC converter 1750 DC/DC low voltage converter is based on differential geometry such that capacitor voltages for capacitors in the low voltage converter converge to nominal values as operating conditions of said system change.

As can be seen, the micro-inverter includes a HV DC/DC converter 1760. This DC/DC converter 1760 shapes a high frequency current passing through the transformer in the power circuit of the HV DC/DC converter. This current shaping is based on sensed operating conditions such as the battery/energy storage voltage, the available power from the PV panels, the output DC bus voltage, the grid voltage, and the grid current. The HV DC/DC converter 1760 also tracks the long-term behaviour of voltages in flying capacitors used in its power circuit and this data can be used to optimize the converter's operation.

The DC/AC inverter 1770 may also be based on a differential geometry control scheme. Such an inverter receives the operating conditions of the destination grid (including grid voltage and grid current), the capacitance voltages of the flying capacitors in its power circuit, and the DC bus voltage. Based on these inputs, the DC/AC inverter controls its flying capacitor voltages such that these voltages converge to a suitable nominal/optimal solution as system conditions change.

Figure 19:
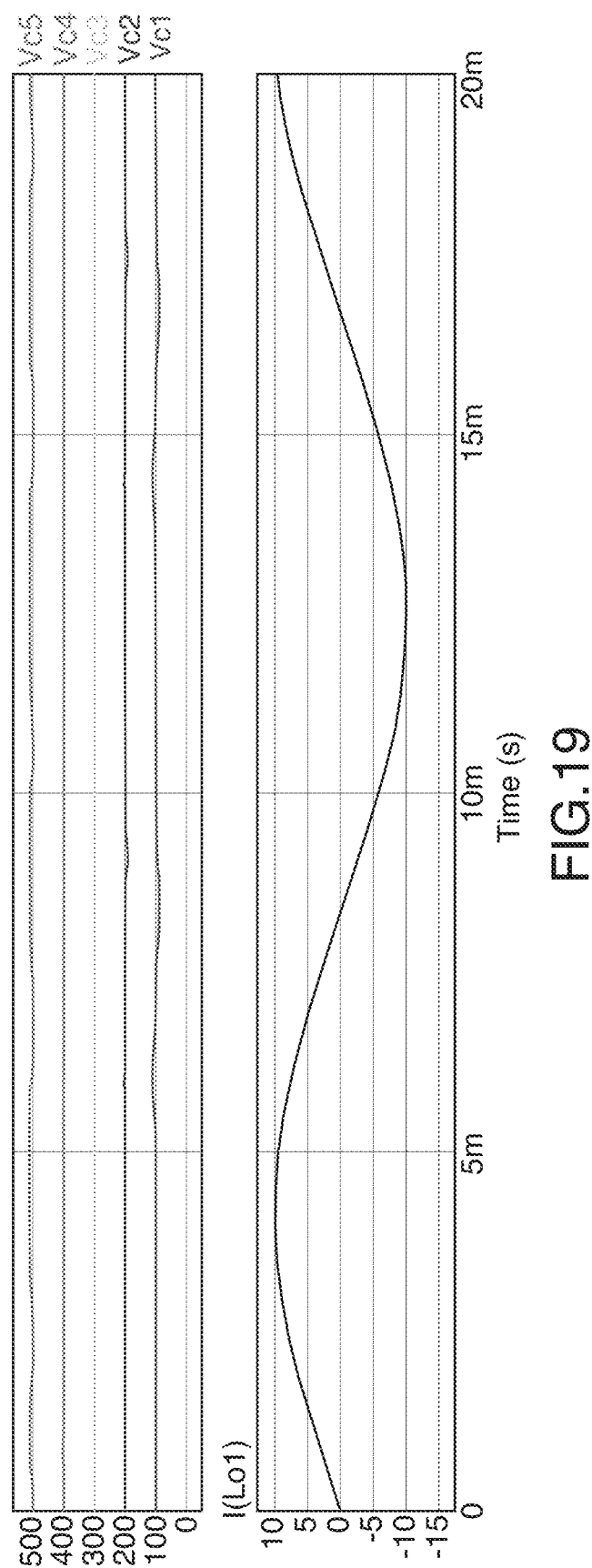
FIG. 19-20 illustrate waveforms produced by simulations of the DC/AC inverter according to the present invention and the microinverters that use such inverters.
Figure 20:
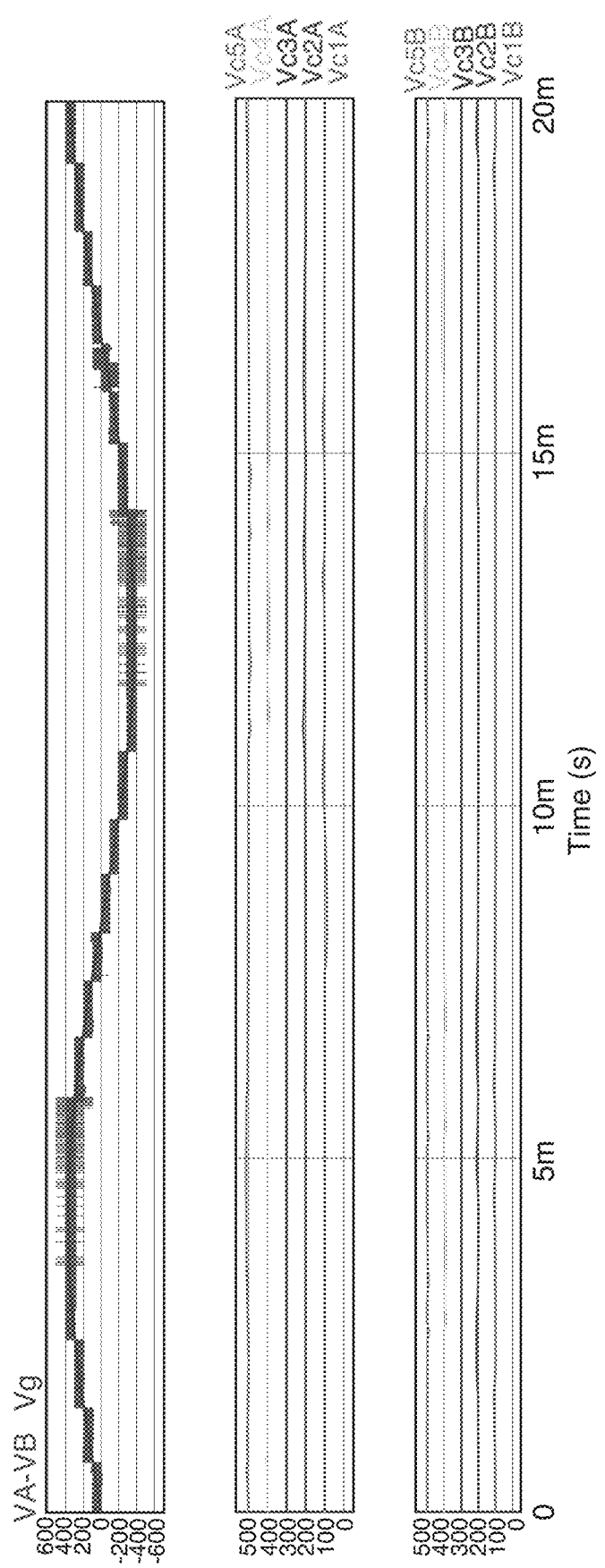

FIG. 19 and FIG. 20 show the simulation results for the DC/AC inverter detailed above.

A person understanding this invention may now conceive of alternative structures and embodiments or variations of the above all of which are intended to fall within the scope of the invention as defined in the claims that follow.

We claim:

1. A DC/AC inverter comprising:
   a power circuit for converting incoming DC power into AC output power suitable for use with an AC power grid, said power circuit comprising at least one semiconductor; and
   a control system comprising:
      a differential geometric controller for determining vector fields necessary such that voltages of flying capacitors in said power circuit, over time, converge to an optimum value, wherein said differential geometric controller receives, as inputs, said voltages of said flying capacitors in said power circuit and produces data detailing desired vector fields;
      a current controller receiving grid operating conditions for said power grid and producing data detailing a duration of application for said desired vector fields, said data being based on said grid operating conditions; and
      a geometric modulator receiving said data detailing desired vector fields and data detailing said duration of application for said desired vector fields, said geometric modulator producing switching pulses for said at least one semiconductor in said power circuit based on said desired vector fields and on said duration of application for said desired vector fields.

2. The DC/AC inverter according to claim 1, wherein said power circuit comprises:
   a plurality of pairs of circuit element modules, each of said circuit element modules comprising one of a plurality of semiconductors;
   a plurality of said flying capacitors, each of said flying capacitors being associated with a specific pair of circuit element modules;
   a pair of output circuit element modules coupled to each other in series; and
   an output inductor;
   wherein
   each of said plurality of circuit element modules is coupled in series to other circuit element modules to form a chain of circuit element modules;
   each of said flying capacitors is coupled between a first coupling point and a second coupling point in said chain of circuit element modules and each of said flying capacitors and each pair of circuit element modules is arranged in said chain such that, for each specific flying capacitor of said flying capacitors, a specific pair of circuit element modules associated with said specific flying capacitor is coupled in said chain between a specific first coupling point and a specific second coupling point between which said specific flying capacitor is coupled;

said output circuit element modules in series is coupled in parallel with said chain;

said output inductor is coupled between said power grid and a coupling point that is midway in said chain;

said power grid is coupled to a point midway between said output circuit element modules; and said switching pulses produced by said geometric modulator control said plurality of semiconductors in-said-circuit-element-modules.

3. The DC/AC inverter according to claim 1, wherein said power circuit comprises:

a plurality of pairs of circuit element modules, each of said circuit element modules comprising one of a plurality of semiconductors, said plurality of pairs of circuit element modules being arranged in two chains of circuit element modules;

a plurality of said flying capacitors, each of said flying capacitors being associated with a specific pair of circuit element modules; and a first output inductor and a second output inductor; wherein each of said plurality of circuit element modules is coupled in series to other circuit element modules to thereby form said two chains of circuit element modules, a first chain of circuit element modules being in parallel with a second chain of circuit element modules;

each of said flying capacitors is coupled between a first coupling point and a second coupling point in said chain of circuit element modules and each of said flying capacitors and each pair of circuit element modules is arranged in one of said two chains such that, for each specific flying capacitor of said flying capacitors, a specific pair of circuit element modules associated with said specific flying capacitor is coupled in said one of two chains between a specific first coupling point and a specific second coupling point between which said specific flying capacitor is coupled;

said first output inductor is coupled between said power grid and a first coupling point midway in said first chain of circuit element modules;

said second output inductor is coupled between said power grid and a second coupling point midway in said second chain of circuit element modules; and said switching pulses produced by said geometric switching pulse generator control said plurality of semiconductors.

4. The DC/AC inverter according to claim 2, wherein at least one of said plurality of flying capacitors is coupled in parallel with a DC/DC converter, said DC/DC converter being coupled to a PV panel and said DC/DC converter being for performing maximum power point tracking for said PV panel.

5. The DC/AC inverter according to claim 2, wherein at least one of said plurality of flying capacitors is coupled in parallel with a buck converter, said buck converter being coupled to a PV panel and said buck converter being for performing maximum power point tracking for said PV panel.

6. The DC/AC inverter according to claim 3, wherein at least one of said plurality of flying capacitors is coupled in parallel with a DC/DC converter, said DC/DC converter being coupled to a PV panel and said DC/DC converter being for performing maximum power point tracking for said PV panel.

7. The DC/AC inverter according to claim 3, wherein at least one of said plurality of flying capacitors is coupled in parallel with a buck converter, said buck converter being coupled to a PV panel and said buck converter being for performing maximum power point tracking for said PV panel.

* * * * *